Nov. 26, 1968 A. B. LINDQUIST 3,413,616

PERSISTENT SUPERCURRENT ASSOCIATIVE MEMORY SYSTEM

Filed Dec. 22, 1960 7 Sheets-Sheet 1

INVENTOR
ARWIN B. LINDQUIST

BY Joseph C. Redmond, Jr.

ATTORNEY

EXCLUSIVE-OR

| INPUT LINE 32 | INPUT LOOP 125 | OUTPUT LINE 171 |
|---|---|---|
| 1 | 0 | 1 |
| 0 | 1 | 1 |
| 0 | 0 | 0 |
| 1 | 1 | 0 |

EXCLUSIVE OR COMPLEMENT

| INPUT LINE 32 | INPUT LOOP 125 | OUTPUT LINE 161 |
|---|---|---|
| 1 | 0 | 0 |
| 0 | 1 | 0 |
| 0 | 0 | 1 |
| 1 | 1 | 1 |

| INPUT LINE 32 | INPUT LOOP 125 | OUTPUT LINE 171 |
|---|---|---|
| 1 | 0 | 1 |
| 0 | 1 | 1 |
| 0 | 0 | 0 |
| 1 | 1 | 0 |

| INPUT LINE 32 | INPUT LOOP 125 | OUTPUT LINE 161 |
|---|---|---|
| 1 | 0 | 0 |
| 0 | 1 | 0 |
| 0 | 0 | 1 |
| 1 | 1 | 1 |

| INPUT LINE 32 | INPUT LOOP 125 | OUTPUT LINE 171 |
|---|---|---|
| 1 | 0 | 1 |
| 0 | 1 | 1 |
| 0 | 0 | 0 |
| 1 | 1 | 0 |

| INPUT LINE 32 | INPUT LOOP 125 | OUTPUT LINE 161 |
|---|---|---|
| 1 | 0 | 0 |
| 0 | 1 | 0 |
| 0 | 0 | 1 |
| 1 | 1 | 1 |

| INPUT LINE 32 | INPUT LOOP 125 | OUTPUT LINE 171 |
|---|---|---|
| 1 | 0 | 1 |
| 0 | 1 | 1 |
| 0 | 0 | 0 |
| 1 | 1 | 0 |

| INPUT LINE 32 | INPUT LOOP 125 | OUTPUT LINE 161 |
|---|---|---|
| 1 | 0 | 0 |
| 0 | 1 | 0 |
| 0 | 0 | 1 |
| 1 | 1 | 1 |

United States Patent Office 3,413,616

Patented Nov. 26, 1968

3,413,616

PERSISTENT SUPERCURRENT ASSOCIATIVE MEMORY SYSTEM

Arwin B. Lindquist, Poughkeepsie, N.Y., assignor to International Business Machines Corporation, New York, N.Y., a corporation of New York Filed Dec. 22, 1960, Ser. No. 77,777
21 Claims. (Cl. 340—173.1)

This invention relates to cryogenic circuits and more particularly to persistent supercurrent cryogenic circuits employed in memory systems.

Cryogenic devices and circuits are described in an article entitled "The Cryotron—A Superconductive Computer Element," by D. A. Buck, which appeared in the "Proceedings of the I.R.E.," April 1956, pp. 482–493. The article includes a summary of the theory of superconductivity, a history of development and a bibliography of informative publications regarding superconductivity. One form of cryogenic circuit of particular interest to the present invention is a persistent supercurrent cryogenic circuit which is described in an article entitled "Cryogenic Devices in Logical Circuitry and Storage," by J. W. Bremer, which appeared in the publication "Electrical Manufacturing," February 1958, pp. 78–83. The article describes a memory device employing a loop of superconducting material that has a persistent loop current in one direction for one storage condition or a persistent loop current in the other direction for a second storage condition. A plurality of persistent supercurrent cyrogenic circuits which cooperate together in a memory system is described in a previously filed U.S. application, Ser. No. 30,019, now Patent No. 3,170,145, entitled "Memory System," filed on May 18, 1960 which is assigned to the same assignee as the present invention. The "Memory System" of the previously filed application, however, is not adapted for associative memory operation, that is retrieving or storing a unit of data such as a word by specifying the information content of an arbitrary portion of the word structure. Associate memory system operation is well known in the art, however, the operation of such a system being described in a previously filed U.S. application, Ser. No. 858,793, now Patent No. 3,229,255, filed Dec. 10, 1959, and assigned to the same assignee as that of the present invention. Briefly, associative operation is accomplished by supplying to the memory, input signals which are representative of some or all of the information to be stored in or retrieved from the storage register. The input signals are compared with the information stored in the registers to select those registers which contain the portion of information upon which the comparison is to be performed. Thereafter, the desired information is transferred into or out of the memory according to the operation selected for the memory. Where it is desired to compare certain storage positions with the signals and to exclude others, the excluded storage positions are adapted to be "masked out" of the comparison when the comparison operation is executed.

In the case of a persistent supercurrent memory device adapted for associative operation, the memory device should employ storage circuits which are of simple construction and economical in the use of cryogenic devices. Moreover, such circuits should be capable of providing a signal when information stored in the circuit is not equal to the information of an external source. Such circuits should also be adapted to provide a signal when the information in the circuit and that of an external source are equal, the previous operations of the circuit being similar to the well known Exclusive-OR operation and complement operation thereof, respectively. It is also desirable to have persistent supercurrent circuits for associative memory systems that perform a no compare operation when the memory is interrogated by a signal from an external source.

A general object of the present invention is a cryogenic circuit adapted to perform an Exclusive-OR and complement operation thereof as well as being suitable for use as a storage bit in a register of a persistent supercurrent associative memory system.

One object is a cryogenic circuit employed as a storage bit of an associative memory register that is economical in the use of cryogenic devices.

Another object is a persistent supercurrent associative memory bit which permits comparison of information therein with information of an external source for equality or inequality of the information.

Another object is a plurality of persistent supercurrent Exclusive-OR circuits in an associative memory system.

Still another object is an associative memory system employing persistent supercurrent memory bits in the registers thereof and adapted for masking of any or all of the bits in the register upon interrogation by an external source.

These and other objects are accomplished in accordance with the present invention, one illustrative embodiment of which comprises an input register for recording binary values to be stored in or retrieved from a matrix which comprises a plurality of registers arranged to form the rows in the matrix. Each register has a plurality of storage positions or elements formed from persistent supercurrent loops. Corresponding storage positions or elements in the registers are connected together to form the columns in the matrix configuration. The input register controls external signals supplied to the registers, the external signals being representative of binary values and corresponding to the binary values recorded in the register. A read and write line to each register enable the binary values recorded in the input register to be read into one or more registers at the same time or to be read out of one register respectively. Control devices, typically cryotrons, are employed to regulate the storage of the binary information in the storage elements. The binary information is represented as currents in each storage element, a current of one direction or the other in the storage loop being indicative of a particularly binary value. Each storage element also includes means for comparing the binary value stored therein with the binary value present in the input register. A control circuit in response to a switching circuit conditions the matrix for associative operation, that is selecting the registers of the matrix having information which corresponds to the information in the input register and thereafter, selectively transferring information into or out of the matrix. When desired, any storage element of a register may be excluded from the comparison between the information in the register and the information in the matrix.

One feature of the present invention is an information storage circuit employing cryogenic devices and superconductive loops whereby information in the loop can be compared with an input signal and the circuit will provide output signals according to an Exclusive-OR or complement operation.

Another feature is a persistent supercurrent memory system adapted for selective storage or retrieval of information by specifiying either selected lines of a coordinate array or the information content of an arbitrary portion of a word stored in the array.

Another feature is a memory device adapted to compare words in the device with words appearing at an external source and to mask selected storage positions out of the comparison by not supplying a signal to the selected storage positions.

Another feature is a persistent supercurrent storage circuit in combination with an energizable compare equal or not equal circuit and an external signal source, the compare or not equal circuit, when energized, indicating whether information in the storage circuit corresponds to or does not correspond to information in the external signal source.

A specific feature of the present invention is a cryotron having a control conductor connected to both a superconductive loop and an external signal source and a gate conductor connected in series with a current indicating means whereby current from the indicating means is prevented from flowing through the gate conductor when a current is circulating in the loop and no current is flowing from the external source or when current is flowing from the external source and no current is circulating in said loop.

Another feature of the invention is a persistent supercurrent storage element in combination with an energizable compare equal or not equal circuit and an external signal source, the storage element including means to mask the information stored therein when the compare equal or not equal circuit is energized.

A specific feature is a plurality of persistent supercurrent storage elements each having a single storage loop and three cryotron devices, one cryotron of each element having a gate conductor in series with an energizable compare equal or not equal circuit and a control conductor connected in series with an external signal source whereby energizing the compare equal and not equal circuit and connecting the external signal source to selected storage elements will compare the information of the external signal source to those storage elements and mask those storage elements where the external signal source is disconnected therefrom.

Still another feature is a plurality of registers each including a plurality of persistent supercurrent storage circuits and an input circuit, the registers being arranged to form the rows of a matrix and corresponding storage circuits in the registers connected together to form the column of the matrix, whereby said rows of the matrix cooperate with read, write and compare equal or not equal signal sources and said columns cooperate with an external signal source to either write information into the registers or to read information out of the registers.

The foregoing and other objects, features and advantages of the invention will be apparent from the following more particular description of preferred embodiments of the invention, as illustrated in the accompanying drawings wherein.

Figure 1:
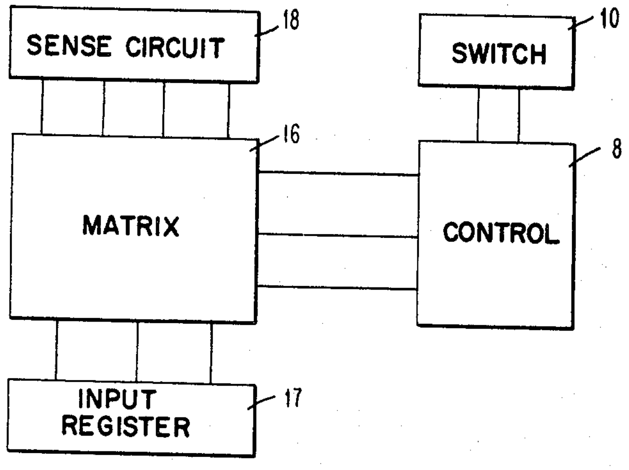
FIG. 1 is a block diagram of a persistent supercurrent associative memory.

One embodiment of an associative memory employing the principles of the present invention is shown in FIG. 1, the memory being adapted to store or read out information by specifying selected lines of a coordinate array or the information content of words stored in the array. The memory comprises an entry register 17 for selecting binary signals representative of information desired to be placed into or read out of a matrix 16 on a selected line basis or compared with all, part, or none of the binary values stored in registers of the matrix for transfer of information into or out of such registers on an associative basis. For associative operation, a control circuit 8 alternately interrogates the matrix 16 for all or part of the information appearing in the register 17, and thereafter conditions the matrix 16 for information transfer into or out of the matrix. A switching circuit 10 is operable to set the control circuit 8 for either the interrogating or the information transfer operation. A plurality of read and write lines (not shown) to the matrix in conjunction with the input register permit words to be stored or read out of the matrix on a selected line basis. A sense circuit 18 includes output circuits for the matrix and supplies current to the matrix for readout purposes during selected line and associative operation.

Having described generally the structural arrangement of the memory of the present invention, the succeeding paragraphs will be devoted to describing the detailed circuits of each unit included in the memory, as well as modifications thereto, and thereafter, describing the selected line and the associative operations of the memory.

Figure 2:
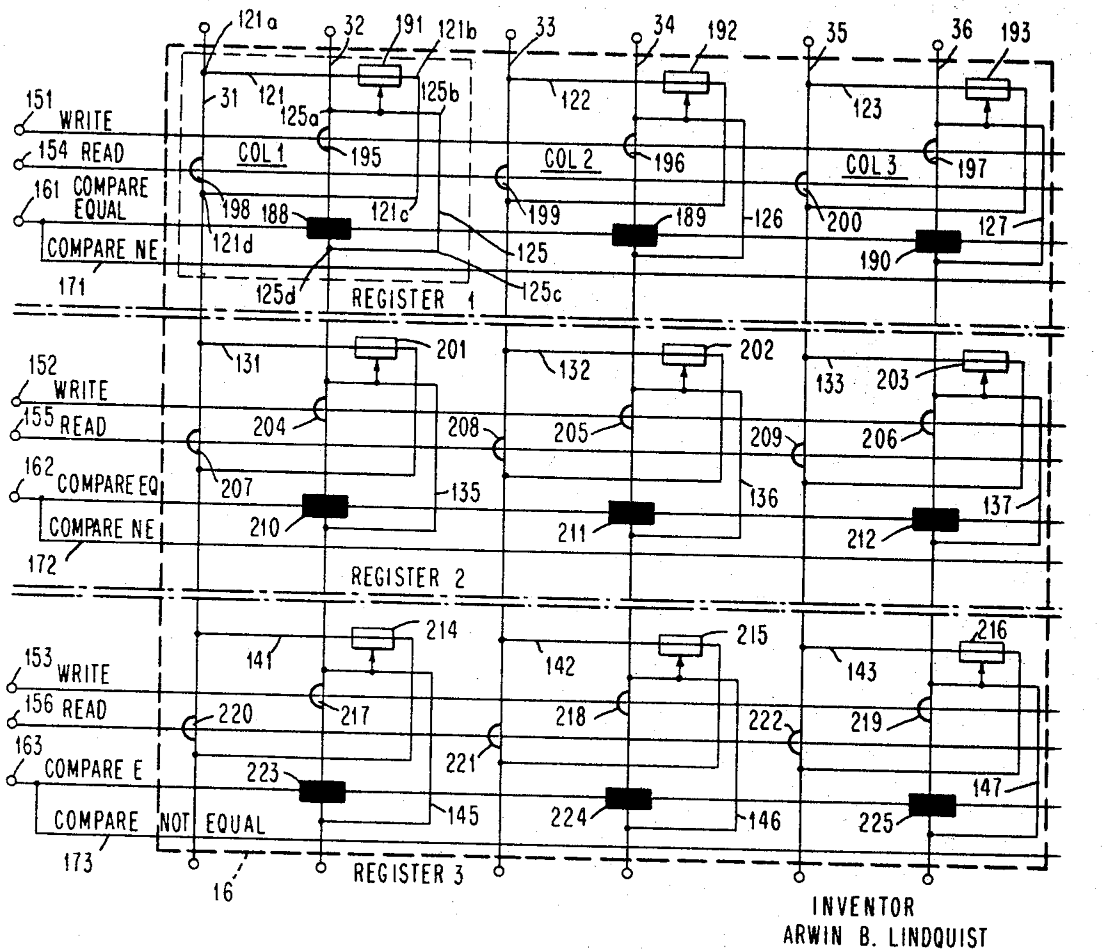
FIG. 2 is a two-dimensional schematic of a storage matrix, included in FIG. 1.

The matrix 16 of the memory is shown in FIG. 2, the matrix including a plurality of registers one through three which are disposed along the rows of the matrix. Each register includes three storage locations which will be described in more detail hereinafter. Corresponding storage locations of each register are connected together to form the columns of the matrix. It is to be understood, of course, that the matrix may comprise any number of rows and columns. A 3 word or 9 bit memory having been selected arbitrarily for reasons of convenience in explanation.

Currents are supplied at the top and bottom of each column (see FIG. 3), positive currents being supplied to terminals 21 through 23 and negative currents being supplied to terminals 41 through 43. Positive currents normally flow along vertical lines 31 through 36 to exit terminals 11 through 13 (see FIG. 3) or through alternate paths 174, 175 and 176 included in columns 1, 2 and 3, respectively to a current sink. At a different time, the negative currents flow along the same lines to exit terminals 4 through 6 (see FIG. 3) or through alternate paths 177, 178 and 179 included in columns 1, 2 and 3 to a current sink. Currents in the vertical lines 31 through 36 are controlled by the input device 17 during the period information is being transferred into or out of the matrix 16. The input device also controls the currents on the lines 31 through 36 during the period information in the matrix is being compared with the information appearing in the input register.

Figure 3:
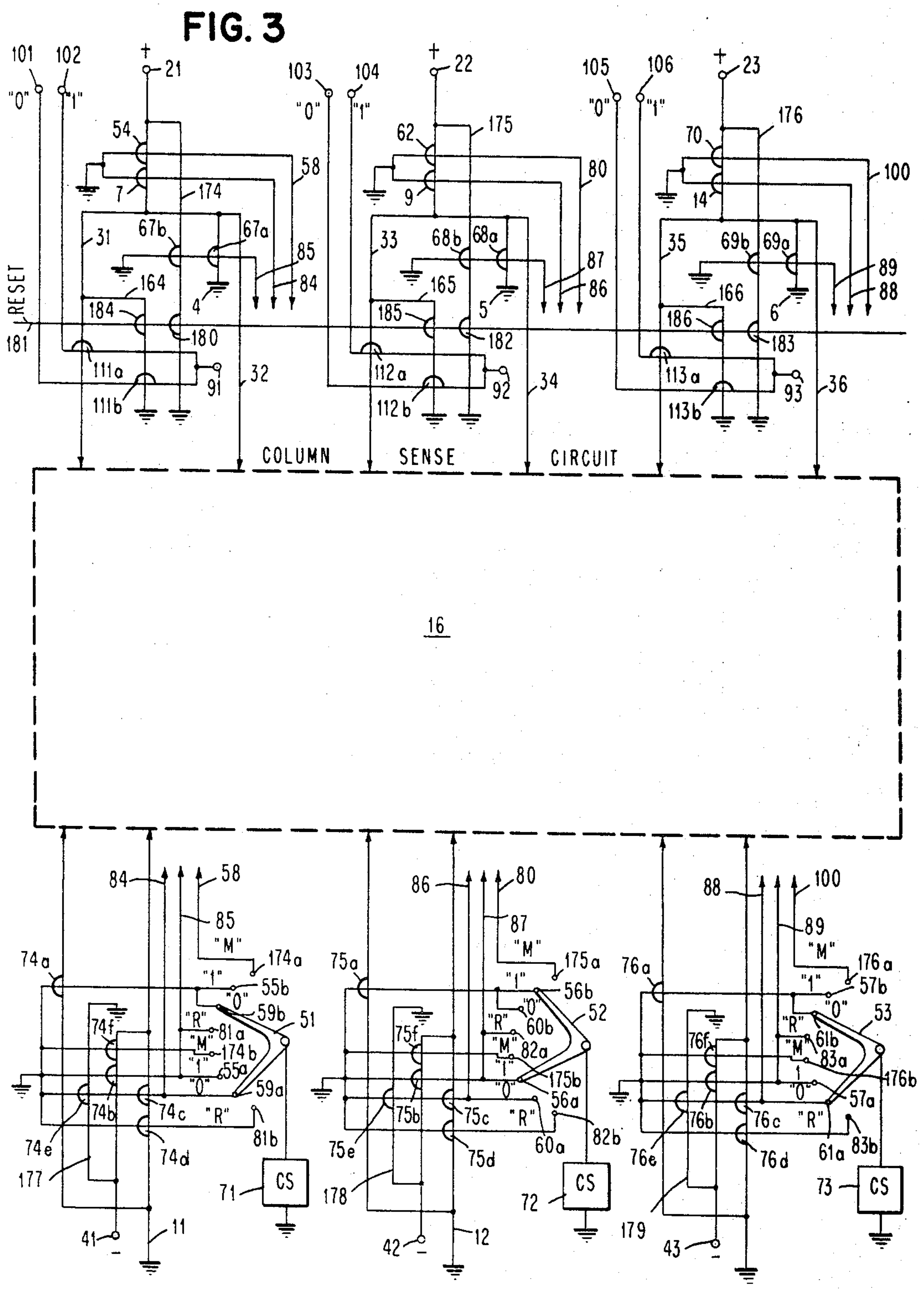
FIG. 3 is an electrical schematic of an input register and a sense circuit included in FIG. 1.

The input device 17 shown in FIG. 3 has a plurality of switches 51 through 53, each switch including two arm members which are rigidly connected together to engage respective contacts 55*a* through 57*a* and 55*b* through 57*b* to represent a binary "1." To represent a binary "0," the switches 51 through 53 are closed on respective contacts 59*a* through 61*a* and 59*b* through 61*b*. To read the information stored in the matrix, the switches 51 through 53 may be set on respective contacts 81*a* through 83*a* and 81*b* through 83*b*. A column may be masked out of the memory by setting the switches 51 through 53 in the respective contacts 174*a* and *b* through 176*a* and *b*.

Connected in series with the switches 51 through 54 are respective current sources 71 through 73, which are regulated by suitable means (not shown) well known in the art to supply the same amount of current to each cryotron regardless of the number of cryotrons connected to the source. The switch 51 controls the current applied to cryotrons 74*a, b, c, d, e* and *f* of the input register and cryotrons 7, 54 and 67*a* and *b* of the sense circuit. The switch 52 controls the current applied to cryotrons 75*a, b, c, d, e* and *f* of the input register and cryotrons 9, 62 and 68*a* and *b* of the sense circuit. The switch 53 controls the current applied to cryotrons 76*a, b, c, d, e* and *f* of the input register and cryotrons 14, 70 and 69*a* and *b* of the sense circuit.

The cryotrons 7, 9, 14, 54, 62 and 70 of the sense circuit shown in FIG. 3 are adapted to disconnect the terminals 21, 22 and 23, respectively from the vertical lines 31 through 36. When disconnected, currents at the terminals 21, 22 and 23 flow through the alternate paths 174, 175 and 176, respectively to the current sink until reset occurs, as will be explained hereinafter. The cryotrons 67*a* through 69*a* are adapted to prevent current from flowing to the exit terminals 4 through 6. The cryotrons 74*b* and *f* through 76*b* and *f* disconnect the terminals 41, 42 and 43 from the vertical lines 31 through 36. When disconnected from the vertical lines, current at the terminals 41, and 42 and 43 flows through the alternate paths 177, 178 and 179 to current sinks.

A characteristic of superconductivity is that once current is flowing on one of two paths, the current cannot be diverted to the other path simply by making the other path superconductive. Instead, the first superconductive path must be made resistive whereupon current on the line will be diverted to the other superconductive path. Thus, for the present invention, a reset line 180 is required to divert current flow on the lines 174, 175 and 176 to the vertical lines 31 through 36 when it is desired to supply current to the latter lines from the supplies 21, 22 and 23. The reset line operates cryotrons 181 through 183 in the alternate paths 174 through 176. The reset line also operates cryotrons 184 through 186 included in alternate paths 164 through 166 provided for the vertical lines 31, 33 and 35, respectively.

A reset line is not required for the alternate paths 177 through 179 since resetting can be performed by connecting cryotrons 74*e* through 76*e* to the binary "0" position of the switches 51 through 53, respectively.

In addition to these cryotrons, the sense circuit 18 includes terminals 91 through 93 which are connected to a suitable current source (not shown) during a readout operation. During readout, currents at the terminals 91 through 93 flow to various ones of output terminals 101 through 106 by way of cryotrons 111*a* and *b* and 113*a* and *b* depending upon the status of the information stored in the respective storage elements of the registers. The cryotrons 111*a*, 112*a* and 113*a* are controlled by the currents on the vertical lines 31, 33 and 35 respectively. In contrast, the cryotrons 111*b*, 112*b* and 113*b* are controlled by the alternate paths 164 through 166, respectively provided for the lines 31, 33 and 35 respectively when current flow thereon is terminated.

Current from the terminal 91 flows through either cryotron 111*a* or 111*b* to the output terminals 101 and 102 depending upon which cryotron is resistive. Similarly, current from the terminal 92 flows through either cryotron 113*a* or 113*b* to the output terminals 103 and 104 depending upon which cryotron is resistive. For column 3, current also flows from the terminal 93 through cryotron 115*a* or 115*b* to the output terminals 105 and 106 depending upon which cryotron is resistive. As will be explained in more detail hereinafter, current appearing at the terminals 101, 103 and 105 is indicative of a binary "0" stored in the memory whereas current appearing at the terminals 102, 140 and 106 is indicative of a binary "1" stored in the memory.

Returning now to the matrix shown in FIG. 2, the register 1 includes sense loops 121 through 123 associated with respective storage loops 125 through 127, the former loops being connected to the vertical lines 31, 33 and 35 respectively, whereas the latter loops are connected to the vertical lines 32, 34 and 36 respectively. Register 2 includes sense loops 131 through 133 associated with respective storage loops 135 through 137, the former loops being connected to the vertical lines 31, 33 and 35, respectively, whereas the latter loops are connected to the vertical lines 32, 34 and 36, respectively. Register 3 includes sense loops 141 through 143 and associated with respective storage loops 145 through 147, the former loops being connected to the vertical lines 31, 33 and 35, respectively, whereas the latter loops are connected to the vertical lines 32, 34 and 36, respectively. Each of the foregoing loops is defined by the points *a*, *b*, *c* and *d* associated with the loop number. Registers 1 through 3 have respective write lines 151 through 153 and respective read lines 154 through 156. Each register has also respective compare equal lines 161 through 163, and compare not equal lines 171 through 173 connected to the compare equal lines. The inductance of the compare equal and not equal lines is such that normally, current flows on the compare equal line until a cryotron located therein becomes resistive after which current is diverted to the compare not equal line.

Bistable devices, typically cryotrons, are employed in each register to control the storage of information therein. Cryotrons are normally two element devices, one element being defined as a gate wire and the other element being defined as a control wire. Where one control wire is employed, the cryotrons is referred to as a single control device. Where more than one control wires are employed, however, the cryotrons is referred to as a dual control device. Single and dual control cryotrons are described in the publication by D. A. Buck cited above. As described there, the gate wire is adapted to change resistive state in accordance with current flowing in one or more control wires.

Four cryotrons are employed at each crosspoint of the matrix, that is, the intersection of each set of vertical lines with the write, read and compare lines of each register. Two of the cryotrons at each crosspoint are represented in the drawing as being constructed of thin film devices of the type shown and described in a previously filed U.S. application, Ser. No. 625,512, filed on Nov. 30, 1956, by R. L. Garwin and assigned to the same assignee as that of the present invention. One of the remaining cryotrons is represented in the drawing as being an inline cryotron which has the properties that with the current in the control and gate lines traveling in the same direction, the gate line will be resistive. With the currents in the gate and control lines in opposite directions or there is no current in the control line, the gate line will be superconducting. An inline cryotron is described in a previously filed U.S. application, Docket 10,307, Ser. No. 16,431, filed on Mar. 21, 1960 and assigned to the same assignee as that of the present invention. The remaining cryotron at a crosspoint is represented in the drawing as being thin film devices whose properties are such that kI current of either direction in the control line where I is the magnitude of the current in the line and k is a constant equal to $.5<k<1$ will not make the gate line resistive. Current of 2kI in the control line, however, will make the gate line resistive. The latter or controlled current cryotron is shown in the drawing as a solid rectangle to distinguish it from the conventional thin film cryotron. Cryotrons of the latter type are more fully described in the Buck publication cited above.

In register 1, the sense loops 121 through 123 include respective inline cryotrons 191 through 193, the gate and control wires thereof being in the sense loops 121 through 123 and the storage loops 125 through 127, respectively. The write line of register 1 includes the control conductor of thin film cryotrons 195 through 197 of columns 1, 2 and 3 respectively, the gate conductor of these cryotrons being included in the vertical lines 32, 34 and 36, respectively. The read lines of register 1 include the control conductors of cryotrons 198 through 200, the gate conductor of these cryotrons being included in the vertical lines 31, 33 and 35. The compare equal lines include the gate conductors of cryotrons 188 through 190, the control conductor of the cryotrons being included in the vertical lines 32, 34 and 36. It should be also noted that cryotrons 188 through 190 are also included in storage loops 125, 126 and 127, respectively. As will be explained in more detail hereinafter, the cryotrons 188 through 190 will be driven resistive if a persistent current circulating in the storage loops 125 through 127 respectively combines with the current on the vertical lines 32, 34 and 36, respectively to cause current of 2kI to flow through the respective cryotrons. When any of the cryotrons 188 through 190 are resistive, current will not flow along the equal line 161.

Register 2 includes sense loops 131 through 133 associated with the respective storage loops 135 through 137. Inline cryotrons 201 through 203 are disposed in the respective sense and storage loops of register 2 in the manner described for cryotrons 191 through 193 of register 1. Thin film cryotrons 204 through 206 are disposed in the write line 152 and the vertical lines 32, 34 and 36 respectively of register 2 in the manner described for cryotrons 195 through 197 of register 1. Thin film cryotrons 207 through 209 are disposed in the read line 155 and the vertical lines 31, 33 and 35 respectively of register 2 in the manner described for cryotrons 198 through 200 of register 1. Similarly, cryotrons 210 through 212 are disposed in the compare equal line 162 and the vertical lines 32, 34 and 36, respectively of register 2 in the manner described for cryotrons 188 through 190 of register 1.

Register 3 includes sense loops 141 through 143 associated with the respect storage loops 145 through 147. As in the case of registers 1 and 2, the sense and storage loops include inline cryotrons 214 through 216, respectively. The write line 153 and the vertical lines 32, 34 and 36 include cryotrons 217 through 219 respectively disposed therein in the manner described for corresponding lines of registers 1 and 2. The read line 156 and the vertical lines 31, 33 and 35 include cryotrons 220 through 222, disposed therein in the manner described for corresponding lines of registers 1 and 2. The compare equal line 163 and the vertical lines 32, 34 and 36 include cryotrons 223 through 225, respectively disposed therein in the manner described for corresponding lines of registers 1 and 2.

Figure 4:
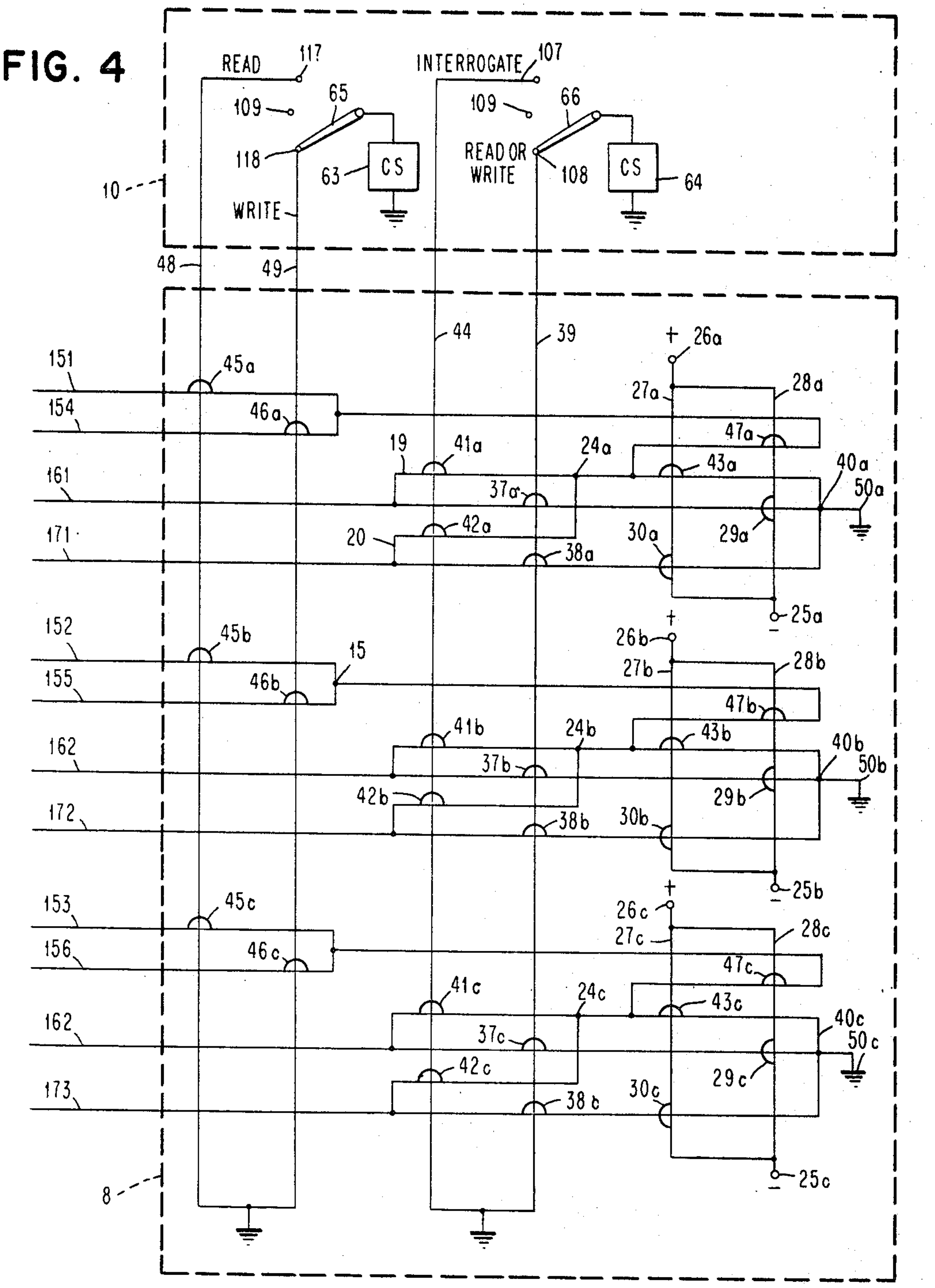
FIG. 4 is an electrical schematic of a control circuit and a switching circuit for the matrix of FIG. 2.

The control circuit 8 of the memory is shown in FIG. 4, the control circuit comprising identical circuits for each register of the matrix. For reasons of brevity, one control circuit will be described for a register, the other control circuits being structurally and operationally identical to the circuit being described. As a consequence, cryotrons employed in the control circuits will have the same numerical designation where they perform the same function, but will be distinguished from each other by sub caps *a*, *b* or *c*, which indicate registers 1, 2 and 3 respectively.

The control circuit associated with register 1 includes the cryotrons **29*a* and 37*a*, and 30*a* and 38*a* in the equal compare line 161 and the not equal compare line 171, respectively. The equal compare and not equal compare lines are connected to node 40*a* and thence to a current sink 50*a*, typically ground. The cryotrons 37*a* and 38*a* are also located in a current supply line 39 from the switching circuit 10 as will be described hereinafter. In contrast the cryotrons 30*a* and 29*a* are located in supply lines 27*a* and 28*a*, respectively, of a current source 26*a* included in the control circuit. The supply lines 27*a* and 28*a* ater passing through cryotrons 29*a* and 30*a*, are connected together at a current sink 25*a*** typically ground.

The equal line 161 and the not equal compare line 171 also include alternate paths through leads **19*a* and 20*a* respectively to the current sink 50*a*. The alternate paths include the gate conductors of cryotrons 41*a* and 42*a* which are connected together at a node 24*a*. The control conductors of the cryotrons 41*a* and 42*a* are located in a second current supply line 44 originating from the switching circuit 10. The node 24*a* is connected through the gate conductor 43*a* to the current sink 50*a*, the control conductor of the cryotron 43*a* being located in the supply line 27*a*. The node 24*a* is also connected through the gate conductor of cryotron 47*a* to the write line 151 and the read line 154 of the matrix, the control conductor of the cryotron 47*a* being included in the vertical line 28*a*. The write line 151 includes the gate conductor of a cryotron 45*a*, the control conductor thereof being included in a supply line 48 from the switching circuit 10. The read line 154 includes the gate conductor of a cryotron 46*a*, the control conductor thereof being included in a supply line 49 from the switching circuit 10**.

A reset line (not shown) is also included in the control circuit to reset the currents on the compare equal and not equal lines after a comparison operation for reasons previously discussed.

The switching circuit for conditioning the control circuit to interrogate the matrix or to transfer information selectively into or out of the matrix, is also shown in FIG. 4 and comprises a current source 63 and 64 connected to the supply lines 48 and 49 and the supply lines 44 and 39 respectively through suitable switching devices 65 and 66, respectively. The switch 65 includes read contact 117 and write contact 118. The switch 66 includes interrogate contact 107 and read or write contact 108. Both switches include a null contact 109.

Before describing the various modes in which the memory device is operated, the operation of a crosspoint or storage element of the matrix will be described. Such a description should facilitate a better understanding of the various modes of operation of the memory. For purposes of illustration only, the matrix crosspoint in column 1, register 1 of FIG. 2 has been selected, this crosspoint being shown in detail in FIG. 5 and enclosed in FIG. 2 by a dashed line. Reference designations appearing in the selected crosspoint of FIG. 2 are also employed in FIG. 5.

Figures 5, 6, 7:
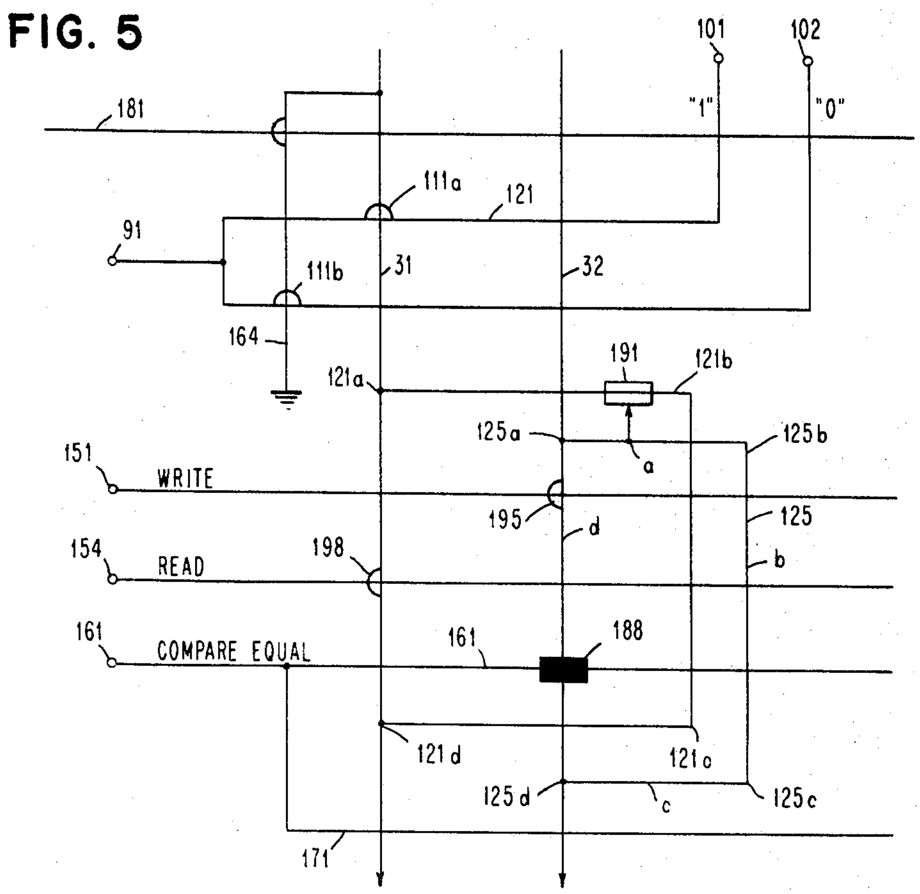
FIG. 5 is an electrical schematic of one embodiment of a storage circuit employed in the matrix of FIG. 2.
FIG. 6 is a table of input and output signals to/from the circuit of FIG. 5.
FIG. 7 is another table of input and output signals for the circuit of FIG. 5.

The memory of the present invention including the circuit shown in FIG. 5 is operated at a low temperature such as by immersion in liquid helium. As a consequence, the gate and control lines of each cryotron included in the circuit of FIG. 5 as well as the storage and sensing loops shown therein are in the superconducting state. To store a "1" in the crosspoint, positive current is applied to the vertical line 32 and a current of either polarity to the write line 151. The write line is the control line for the cryotron 195 which thereupon becomes resistive. Accordingly, current on the line 32 will be diverted at the point **125*a* through the storage loop to the point 125*d* where it returns to the line 32**. With the storage loop sections *a*, *b* and *c* superconducting, the write current is terminated which renders the *d* storage section superconductive, that is, the section is able to conduct current but no current flows therethrough. An explanation for the superconductive phenomena is that the inductance of the *d* storage section without current flowing therethrough is considerably greater than the inductance of the *a*, *b* and *c* storage sections with current flowing therethrough. On release of the current on the line 32, however, a persistent current of kI magnitude is induced in the entire storage loop 125 where k is a constant equal to $.5<k<1$ and I is the magnitude of the current on the line 32. The magnitude of the persistent current is determined by the geometry of the *d* storage section and the *a*, *b* and *c* storage sections. The current is induced into the loop by the collapse of the electromagnetic field associated with the current flowing in the storage sections *a*, *b* and *c*. The persistent current circulates in a clockwise direction to indicate a "1" stored in the circuit.

To store a "0" in a memory bit position, negative current is applied to the line 32 and a current of either polarity is applied to the write line 151. Again the cryotron 195 becomes resistive, but this time current is diverted at the point **125*d*** through the storage sections *c*, *d* and *a* to the point **125*a* where it returns to the line 32**. When the write current is terminated, the *d* storage section becomes superconductive while the *c*, *b* and *a* storage sections are superconducting. Release of the current on the line 32 creates a persistent current of magnitude kI in the storage loop 125 which is in the counter-clockwise direction thereby indicating a "0" stored in the circuit.

Information may be read out of the crosspoint by applying a positive current to the reset line 181 until current is established on the vertical line 31 and thereafter applying current of either polarity to the read line 154. Current is also applied to the terminal 91 of the sense circuit. The read current drives the cryotron 198 resistive, the current on the line 31 being diverted through the sense loop 121. If a "1" is circulating in the storage loop, the clockwise current therein in combination with the current through the sense loop 121 drives the inline cryotron 191 resistive thereby terminating the current on the line 31. As a consequence, the cryotron **111*a* of the sense circuit goes superconductive and the cryotron 111*b* goes resistive due to the current in the alternate path 164. Thereafter, current from the source 91 flows through the cryotron 111*a* to the terminal 101 to indicate the "1" in the circuit. When a "0" is circulating in the storage loop, the counter-clockwise current is not aided by the current in the sense loop to drive the cryotron 191 resistive. As a consequence, current flows on the line 31 to drive the cryotron 111*a* resistive. Current from the source 91 is diverted to the alternate path through cryotron 111*b* and appears at the terminal 102** to indicate a "0" in the circuit.

To compare the information at the crosspoint with an external signal indicative of a "1," a positive current is supplied to the line 32 and to the compare equal line 161. With a "1" stored in the storage loop 125, current of magnitude kI circulates clockwise in the loop in accordance with the previous description. The current on the line 32 will divide at the point **125*a*** such that kI current will travel along the *d* storage section and (l–k) I current will travel in the *a*, *b* and *c* storage sections of the loop 125, Since the loop current in the *d* section and the current flowing into that section from the line 32 are equal and opposite to each other, the net current in the *d* section will be zero and the cryotron 188 will remain superconductive. As a consequence, current will flow on the compare equal line thereby indicating a match between the external signal and the signal stored in the loop. With a "0" stored in the storage loop, however, the loop current of kI circulating in a counter-clockwise direction will additively combine with the current on the line 32 being diverted at the point **125*a*** so that 2kI current flows in the *d* storage section. As a consequence, the cryotron 188 will be driven resistive and current on the compare equal line 161 will be diverted to the compare not equal line 171 to indicate a mismatch between the external signal on the line 32 and the information stored in the loop. On release of the current on the line 32, the storage loop will return to the original state.

When a comparison is desired to be made with an external signal indicative of a "0," a negative current is applied to the line 32 and a current of either polarity is supplied to the compare equal line 161. With a "1" stored in the storage loop, the net current flowing in the *d* storage section will be 2kI which is sufficient to drive the cryotron 188 resistive. Accordingly, current is diverted from the compare equal line 161 to the not equal line 171 to indicate a mismatch between the external signal and the information stored in the loop. With a "0" stored in the storage loop, however, the net current in the *d* storage section is zero and the cryotron 188 remains superconducting. Hence, current flows along the compare equal line to indicate a match between the external signal and the information stored in the storage loop.

The circuit of FIG. 5 is adapted to be masked out of a comparison operation by the absence of a current on the line 32. With no current flowing on the line 32 when current is applied to the compare equal line 161, the loop current cannot be increased in the *d* storage section to drive the cryotron 188 resistive. Thus, current will always flow on the compare line 161 to indicate an equal condition.

The circuit of FIG. 5 also performs an Exclusive-OR and complement operation thereof, provided a current is stored in the storage loop. An Exclusive-OR circuit, as is well known in the art, provides an output when two signals are unlike or no output when two signals are alike. Exclusive-OR operation of the circuit of FIG. 5 is demonstrated by the tabulation shown in FIG. 6 wherein the various combinations of input signals and the output signals therefor are indicated, the operation of the circuit in providing the indicated output signals for the various input signals having been previously described in connection with FIG. 5. As can be seen in FIG. 6, an output signal on line 171 will be provided by the circuit when the input signals are unlike. No output signal will be provided by the circuit when the signals are alike.

Exclusive-OR complement operation, as is well known in the art, provides an output signal when the signals are alike and no output signal when the signals are unlike. In order to obtain Exclusive-OR complement operation of the circuit of FIG. 5, it is only necessary to record output signals on the compare equal line 161. The outputs on the line 161 will be as indicated in the tabulation shown in FIG. 7 for the various combinations of input signals to the circuit, the operation of the circuit having been previously described in connection with FIG. 5. Since outputs are provided when the input signals are alike and no output is provided when the signals are unlike, the tabulation demonstrates the Exclusive-OR complement operation of the circuit of FIG. 5.

Figures 8, 9, 10:
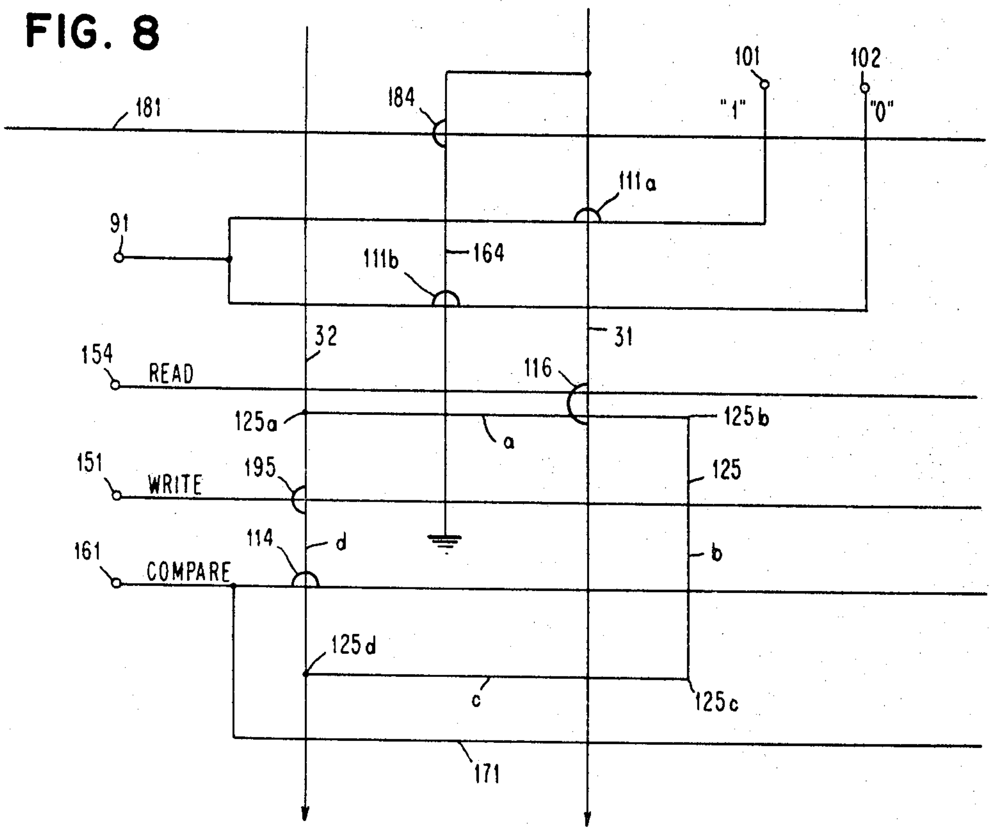
FIG 8 is an electrical schematic of another embodiment of a storage circuit that may be employed in the matrix of FIG. 2.
FIGS. 9 and 10 are tabulations of input and output signals to/from the circuit of FIG. 8.

Another embodiment of a circuit which may be employed as a crosspoint in the matrix of FIG. 2 and also perform an Exclusive-OR and complement operation thereof is shown in FIG. 8. The circuit of FIG. 8 is substantially the same as that shown in FIG. 5. Accordingly, like elements to those shown in FIG. 5 will have the same reference designation in FIG. 8. The principal difference between the circuits of FIGS. 5 and 8 is that a dual control cryotron 116 has been substituted for the inline cryotron 191 and the thin film cryotron 198 of FIG. 5. The structure and operation of a dual control cryotron device have been previously mentioned herein. Another difference between the circuits of FIGS. 5 and 8 is that the sense loop 121 of FIG. 5 is not necessary for the operation of the circuit of FIG. 8 as will appear hereinafter. The remaining difference between the circuits of FIGS. 5 and 8 is that the positions of the vertical line 31, including the cryotrons **111*a* and 116, and the vertical line 32** have been interchanged in the latter circuit to facilitate drawing of the circuit. Operation of the circuit of FIG. 8 which will next be described is similar to that described for FIG. 5.

A writing operation for a binary "1" is accomplished in the circuit of FIG. 8 by applying a positive current to the vertical line 32 and a current of either polarity to the write line 151, the latter current driving the cryotron 195 resistive. As a consequence, the current on the line 32 is diverted above the storage loop 125. On release of the write current, the *d* storage section of the loop becomes superconductive as previously described. Thereafter, release of the current on the vertical line 32 establishes a persistent current of kI magnitude in the storage loop 125, the persistent current circulating in a clockwise direction. To write a binary "0" in the circuit of FIG. 8, a negative current is applied to the vertical line 32 and a current of either polarity is applied to the write line 151, the latter current driving the cryotron 195 resistive. As a consequence, the current on the line 32 arriving at the point 125*d* is diverted about the storage loop 125. Release of the write current renders the *d* storage section of the loop superconductive. Release of the negative current on the line 32 establishes a persistent current of kI magnitude in the storage loop 125, in a counter-clockwise direction for reasons previously described.

Readout of the circuit of FIG. 8 is accomplished by applying current to the line 181 until current is established on the line 31 and thereafter applying a positive current to the read line 154 and to the vertical line 31. Current on the read line flows to the dual control cryotron which is adapted to be driven resistive when the currents on the control lines thereof travel in the same direction. However, where a current is on a single control line or currents on the control lines are in opposite direction, the dual control cryotron will not be changed from the superconductive condition. Thus, a stored binary "1" which circulates clockwise in the storage loop 125 will be in the same direction as the current on the read line 154 resulting in the control currents for the cryotron 116 driving the device resistive. The resistive condition of the cryotron 116 terminates the flow of current on the vertical line 31, which results in the cryotron 111*a* being superconductive. Accordingly, the source 91 is connected through the cryotron 111*a* to the terminal 101 to indicate a "1" stored in the storage loop. With a "0" stored in the storage loop 125, the control currents of the cryotron 116 are in opposite directions which renders the cryotron 116 superconductive. Accordingly, current will flow on the vertical line 31 and drive the cryotron 111*a* resistive. Accordingly, the source 91 will be connected through the cryotron 111*b* to the terminal 102 to indicate a "0" stored in the storage loop.

The circuit of FIG. 8 performs a comparison operation for a binary "1" when a positive current is applied to the vertical line 32 and to the compare line 161. With a "1" stored in the storage loop 125, the persistent current in the *d* storage section will be nullified by the current on the line 32 being diverted into the *d* storage section, as previously explained. Since no current flows in the *d* storage section, the cryotron 114 remains superconductive and the current will flow on the compare line 161 to indicate a match between the external signal and information in the storage loop. When a "0" is stored in the storage loop, the current in the *d* storage section will additively combine with that being diverted from the point 125*a* to drive the cryotron 114 resistive. Accordingly, current on the line 161 will be diverted to the line 171 to indicate a mismatch between the external signal and the information stored in the storage loop.

A comparison operation for a "0" stored in the storage loop is accomplished by applying a negative current to the vertical line 32. For reasons similar to those described above, the cryotron 114 will be superconductive when the external signal and the stored signal correspond and resistive when the external signal and the stored signal do not match. Accordingly, current will flow on the compare line 161 in the former instance and in the latter instance current will flow on the line 171.

The circuit of FIG. 8 is also adapted to perform a no compare operation by not putting a signal on the vertical line 32. With no signal on the line 32, the current through the compare cryotron 114 cannot be driven resistive by the current in the loop 125.

The tabulations indicated in FIGS. 9 and 10 demonstrate the Exclusive-OR and Exclusive-OR complement operations of the circuit of FIG. 9, the explanation for the various input and output values of the tabulations having been given in connection with the description of FIG. 9.

Figures 11, 12, 13:
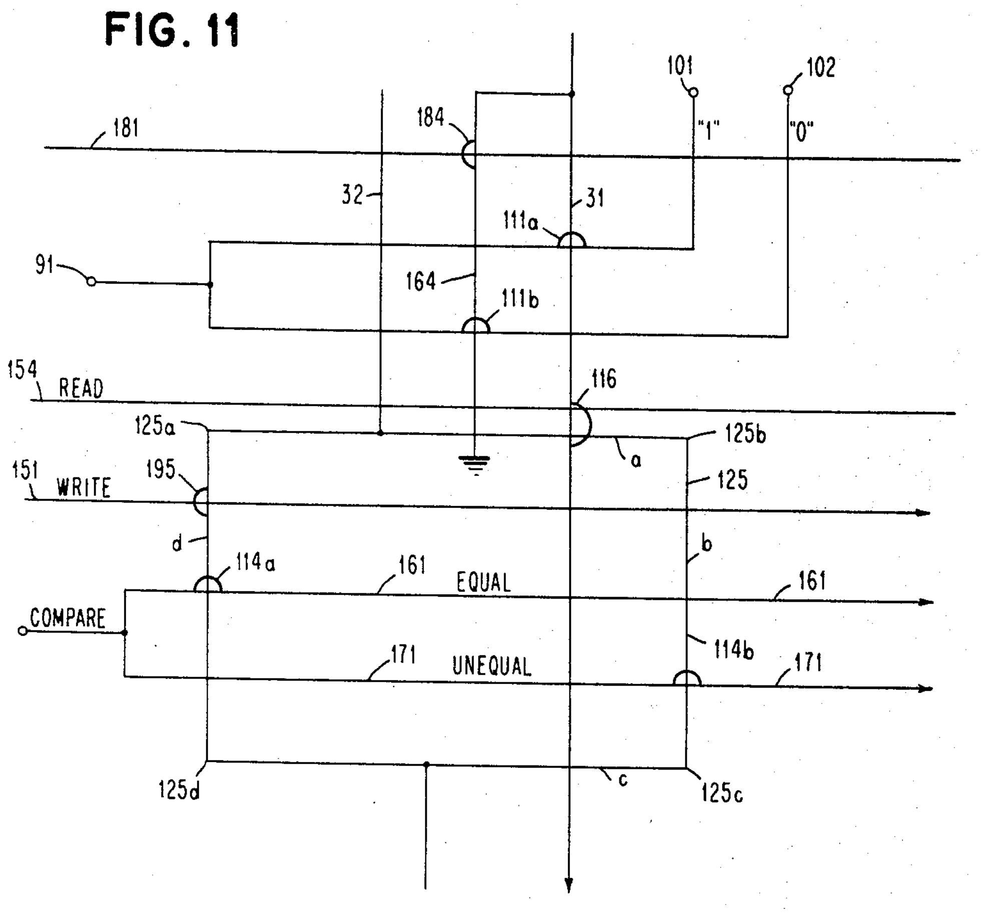
FIG. 11 is an electrical schematic of another embodiment of a storage circuit that may be employed in the matrix of FIG. 2.
FIGS 12 and 13 are tabulations of input and output signals to/from the circuit of FIG. 11.

Another embodiment of a circuit which may be employed as a crosspoint in the matrix of FIG. 2 and also perform an Exclusive-OR and complement operation thereof is shown in FIG. 11. The circuit of FIG. 11 is substantially the same as that shown in FIG. 8 except that an additional cryotron has been disposed in the compare circuit. For purposes of description, the cryotron in the compare equal line has been assigned the reference numeral 114*a* and the cryotron disposed in the compare not equal line has been assigned the reference numeral 114*b*. The cryotron 114*a* is adapted to be driven resistive when the control current is of I magnitude or better. In contrast, the cryotron 114*b* is adapted to be driven resistive when the control current is .5I magnitude or better, for reasons which will become more apparent hereinafter. The principle difference between the circuits of FIGS. 8 and 11 is that the compare circuit of the former figure requires means to reset the compare circuit after a comparison operation, whereas the latter figure eliminates the necessity for a reset circuit to be associated with the compare circuit. Operation of the circuit of FIG. 11 which will next be described is similar to that described for FIG. 8.

A writing operation for a binary "1" is accomplished in the circuit of FIG. 11 by applying a positive current to the vertical line 32 and a current of either polarity to the write line 151, the latter current driving the cryotron 195 resistive. As a consequence, the current on the line 32 is diverted to the right side of the storage loop 125. On release of the write current and the current on the line 32, a persistent current of kI magnitude is stored in the storage loop 125, the persistent current circulating in a clockwise direction. The magnitude of the constant k for the persistent current is approximately .5 since the circuit is designated to distribute equally the current through each branch of the loop. To write a binary "0" in the circuit of FIG. 11, a negative current is applied to the vertical line 32 and a current of either polarity is applied to the write line 151, the latter current driving the cryotron 195 resistive. As a consequence, a counter-clockwise persistent current of .5I magnitude is established in the loop for reasons similar to those previously described for storing a binary "1" in the loop.

Readout of the circuit of FIG. 11 is accomplished by supplying current to the reset line 181 to redirect the current if any on the alternate path 164 to the vertical line 31. Thereafter, a positive current is applied to the read line 154. Current on the read line flows to the dual control cryotron which is adapted to be driven resistive when the current in the storage loop is in the same direction as that on the read line. A stored binary "1" which circulates clockwise in the storage loop 125 will have a persistent current in the same direction as the current on the read line 154. Accordingly, the control currents for the cryotron 116 will drive the device resistive. The resistive condition of the cryotron 116 terminates the flow of current on the vertical line 31. Current on the line 31 is thereupon redirected to the alternate path 164 and drives the cryotron 111*b* resistive. Since the cryotron 111*a* is superconductive, current from the source 91 flows to the output terminal 101 and indicates the binary "1" stored in the circuit. With a binary "0" stored in the storage loop 125, the control currents to the cryotron 116 are in opposite directions which renders the device superconductive. Accordingly, current will flow on the vertical line and drive the cryotron 111*a* resistive. Since the cryotron 111*b* is superconductive, current flows from the source 91 to the output terminal 102 and indicates the binary "0" stored in the circuit.

The circuit of FIG. 11 performs a comparison operation for a binary "1" when a positive current is applied to the vertical line 32 and to the compare line 161. The persistent current for a binary "1" stored in the storage loop combines with the current supplied to the loop by the line 32. In the *d* storage section, the loop current and the line current are of equal and opposite magnitudes. Accordingly, the cryotron 114*a* in the compare equal line remains superconductive. In the *b* storage section, however, the loop current and the line current additively combine to form a control current of I magnitude for the cryotron **114*b*, the magnitude of the control current being sufficient to drive the cryotron 114*b* resistive. Current supplied to the compare circuit, accordingly, flows on the compare equal line 161** to indicate a match between the stored signal and the external signal. For a "0" stored in the storage loop, the loop and line currents in the *d* storage section will additively combine with that to drive the cryotron **114*a*** resistive. The loop and line currents in the *b* storage section, however, will be of equal and opposite magnitudes so that the cryotron **114*b* will remain superconductive. Accordingly, current to the compare circuit will flow on the compare not equal line 171** to indicate the mismatch between the stored signal and the external signal.

A comparison operation for a "0" stored in the storage loop is accomplished by applying a negative current to the vertical line 32 and energizing the compare circuit. For reasons similar to those above, the cryotron **114*a* will be superconductive and the cryotron 114*b* will be resistive when the external signal and the stored signal correspond. The cryotron 114*a* and the cryotron 114*b* will be resistive and superconductive respectively when the external signal and the storage signal do not match. Accordingly, current to the compare circuit will flow on the compare line in the former instance and in the latter instance the current will flow on the compare not equal line 171**.

The tabulations indicated in FIGS. 12 and 13 demonstrate the Exclusive-OR and Exclusive-OR complement operations of the circuit of FIG. 11, the explanation for the various input and output values of the tabulations having been given in connection with the description of FIG. 11.

Figures 14, 15, 16:
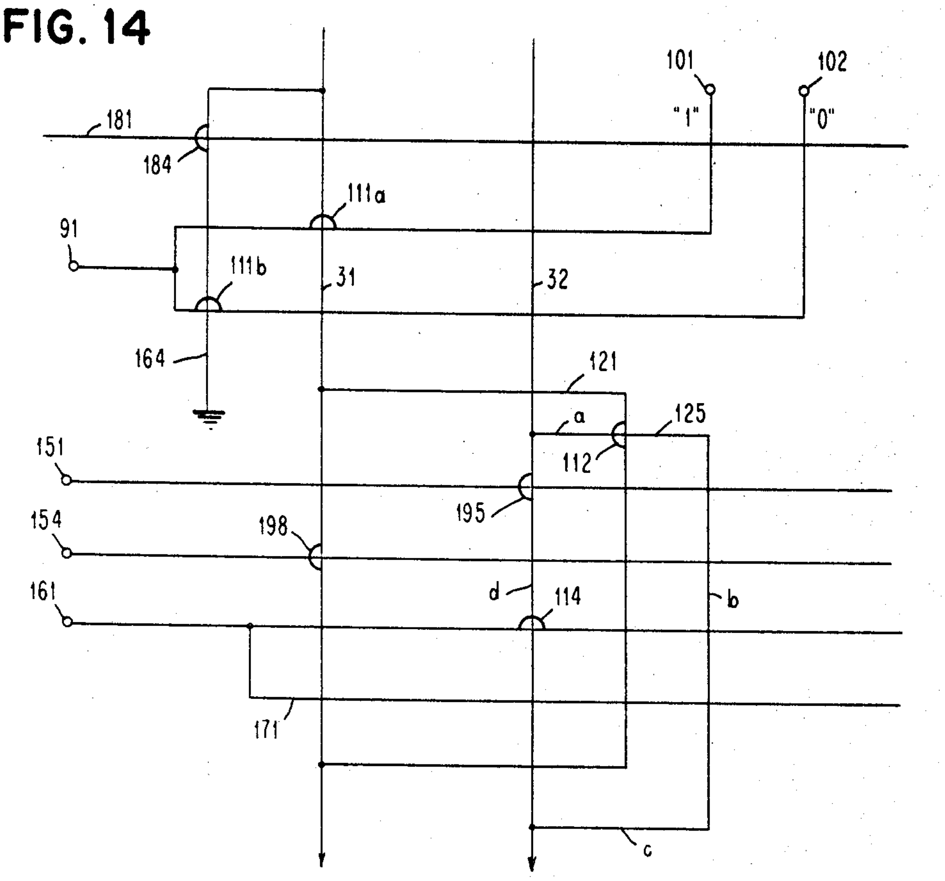
FIG. 14 is an electrical schematic of still another embodiment of a storage circuit that may be employed in the matrix of FIG. 2.
FIGS. 15 and 16 are tabulations of input and output signals to/from the circuit of FIG. 14.

Still another embodiment of a circuit which may be employed as a crosspoint in the matrix of FIG. 2 and also perform an Exclusive-OR and complement operation thereof is shown in FIG. 14. The circuit of FIG. 14 is substantially the same as that shown in FIG. 5. Accordingly, corresponding elements in FIGS. 5 and 14 will have the same reference designation. The principal difference between the circuits of FIGS. 5 and 14 is that thin film cryotrons 112 and 114 have been substituted for the inline cryotron 191 and the controlled current cryotron 188 of FIG. 5. Also, the operation of the circuit of FIG. 14 is slightly different than that of FIG. 5 in that a "1" is represented in the former circuit by a clockwise circulating current of magnitude kI and a "0" is represented in the storage loop by the absence of an I circulating current. Previously, FIG. 5 employed a clockwise circulating current of magnitude kI to indicate a "1" stored therein, and a counter-clockwise current of magnitude kI to indicate a "0" stored therein. Operation of the circuit of FIG. 14 which will next be described is slightly different than that described for FIG. 5.

A writing operation for the circuit of FIG. 14 is accomplished by applying a current to the line 151 and a positive current to the line 32. The write current drives the cryotron 195 resistive which results in the current on the line 32 being diverted around the storage loop 125. On release of the write current, the *d* section of the storage loop 125 becomes superconductive but the current on the line 32 continues to flow through the *a*, *b* and *c* storage sections for reasons previously explained. On release of the current on the line 32, a persistent supercurrent circulates in the storage loop 125 in a clockwise direction, the persistent current being indicative of a "1" stored in the matrix. A "0" is stored in the crosspoint by applying a current to the write line 151 and omitting a current on the line 32. Again, the cryotron 195 is driven resistive but no current appears on the line 32 which prevents a circulating current from being established in the storage loop 125. Any persistent current in the loop will be destroyed when the cryotron 195 is driven resistive.

Readout of the crosspoint of FIG. 14 is accomplished by applying a current to the reset line until current is established on the vertical line 31 and thereafter applying current to the read line 154, the latter current driving the cryotron 198 resistive. As a consequence, the current on the line 31 is diverted through the sensing loop 121 where it passes through the cryotron 112. The control conductor for the cryotron 112 is in the storage loop 125 which drives the cryotron resistive if a circulating current indicative of a "1" is stored therein. When the cryotron 112 is driven resistive, current terminates on the line 31 and the cryotron **111*a* goes superconductive. Accordingly, current from the source 91 flows to the terminal 101 through the cryotron 111*a* thereby indicating a "1" stored in the storage loop 125. When a current is absent in a storage loop 125, the cryotron 112 remains superconductive and current flows along the line 31 thereby driving the cryotron 111*a* resistive. Accordingly, current flows from the source 91 through the cryotron 111*b* to the terminal 102** thereby indicating a "0" stored in the storage loop.

The circuit of FIG. 14 performs a comparison operation when a current is applied to the vertical line 32 and thereafter to the compare line 161. For a "1" stored in the storage loop, the persistent current in the *d* storage section will be nullified by the current on the line 32 being diverted into the *d* storage section as previously explained. Accordingly, without current in the *d* storage section, the cryotron 114 is superconductive which permits current to flow on the line 161 to indicate a match between the external signal and the information stored in the loop. When a "0" is stored in the loop, no current appears in the storage loop and the current on the line 32 is diverted through the *d* storage section to drive the cryotron 114 resistive. The current on the line 161, as a consequence, is diverted to the line 171 to indicate a mismatch between the external signal and the information stored in the loop.

A comparison operation for a "0" stored in the loop is accomplished with current on the line 161 but without current on the vertical line 32. The current in the storage loop 125, as a consequence, controls the resistive condition of the cryotron 114. Thus, for a "1" stored in the storage loop, the cryotron 114 is driven resistive by the current on the *d* section and the current on the line 161 is diverted to the line 171 to indicate a mismatch between the external signal and the information stored in the loop. When a "0" is stored in the loop, the cryotron remains superconductive since no current flows on the *d* section and current flows along the line 161 to indicate a match between the external signal and the information stored in the loop.

The circuit of FIG. 14 cannot be masked out of a comparison operation as can the circuits of FIGS. 5, 8 and 11. Since the circuit of FIG. 14 employs the absence of a signal on the line 32 to write or compare a zero in the storage loop 125, the absence of a signal cannot also be employed as a mask during the comparison operation.

The tabulations indicated in FIGS. 15 and 16 demonstrate the Exclusive-OR and Exclusive-OR complement operations of the circuit of FIG. 14, the explanation for the various input and output values of the tabulations having been given in connection with the description of FIG. 14.

Returning now to FIGS. 2, 3 and 4, the operation of the memory device will be described for the storage or retrieval of information by specifying selected lines of the matrix or the information content of words stored in the matrix.

When it is desired to store or readout information by specifying selected lines of the matrix, the switches 65 and 66 of the switching circuit 10 are positioned on the null contacts 109 and the input register 17 is operated to control the flow of current on the lines 31 through 36. In addition, current is supplied to the write lines 151 through 153 or the read lines 154 through 156, depending upon the desired operation to be performed. For a storing or writing operation, the desired word is set into the input register by operating the switches 51 through 53. The switches may be set for any three bit binary word, the binary word 010 indicated in FIG. 3 being arbitrarily selected to facilitate explanation of the invention. Thereafter, current is supplied to those write lines in which the binary word 010 is desired to be stored. If the word is desired to be stored in all three registers, the write current is applied to the lines 151, 152 and 153. If the word is desired to be stored in a single register, the write current is applied to that register and no other register. Assuming for purposes of the present description that the word is desired to be stored in register 1 only, the write current is applied to the line 151 and no other write lines.

The positions of switches 51 through 53 shown in FIG. 3 connect the current sources 71 through 73 to the cryotrons, 74*a*, *c* and *e*, 75*a* and *b*, and 76*a*, *c* and *e* of the input register and to the cryotrons 7, 68*a* and *b* and 14 of the column sense circuit. The cryotrons in the input register and the column sense circuit control the current supplied to the vertical lines 31 through 36 from the input terminals 21 through 23 and 41 through 43. In column 1, the input register is set to place a binary "0" therein. For the switch position shown in column 1, the cryotrons 74*a*, *c* and *e* and 7 are driven resistive by the current from the source 71. In the event that current is flowing in the alternate path 177 the resistive cryotron 74*c* redirects the current on the line 177 to the line 32 of column 1. The resistive cryotron 7 in the sense circuit causes the current at the terminal 21 to be redirected to the alternate path 174. The cryotrons 74*b* and 67*a* are the only devices superconductive in column 1 which results in the negative current at the input terminal 41 flowing over the vertical line 32 to the reference point 4 through the cryotrons 223, 217, 210, 204, 188 and 195 on the vertical line 32.

In column 2, the input register is set to write a binary "1" therein. For the switch position shown in column 2, the cryotrons 75*a* and 75*b* of the input register are resistive as well as the cryotrons 68*a* and *b* of the column sense circuit. The resistive cryotron 68 resets the current on the alternate line 175 to the vertical line 34. The resistive cryotron 68*a* disconnects the terminal 22 from the exit terminal 5. Current at the terminal 22 can flow either to the line 34 or to the alternate path 165. The circuit is so designed, however, in such a case normally to cause the current to flow on the line 34. Accordingly, positive current flows on the line 34 from the terminal 22 through the cryotrons 196, 189, 205, 211, 218 and 224 to the exit terminal 12. In column 3 the input register is set to write a binary "0" and for reasons similar to those described for column 1, negative current flows on the line 36 due to the cryotrons 76*a*, *c* and *e* of the input register and the cryotron 70 of the column sense circuit being resistive. The negative current on the line 36 flows from the terminal 43 through the cryotrons 225, 219, 212, 206, 190, 197 and 69*a* to the exit terminal 6.

The write current on the line 151 drives the cryotrons 195, 196 and 197 resistive and diverts the current on the vertical lines 32, 34 and 36 through the storage loops 125 and 126 and 127 respectively. Release of the current on the line 151 returns the cryotrons 195, 196 and 197 to the superconductive condition but current does not flow through the *d* storage section of each loop for reasons previously described. Release of the current on the vertical lines 32, 34 and 36 establishes a counter-clockwise circulating current in the loop 125 and 127 and a clockwise circulating current in the loop 126 for reasons previously described, the counter-clockwise current being indicative of a "0" stored in the loops and the clockwise circulating current being indicative of a "1" stored in the loop.

Thus, it can be seen that information is read into one or more registers of the matrix on a selected line basis by operation of the input register and the application of current to the particular write lines in which the word is desired to be stored.

Readout of the matrix is limited to a single register at a time since there is only one output circuit from a column. It should be understood, of course, that an output circuit could be provided for each register so that more than one output could be obtained. One output circuit was selected to facilitate the description of the invention. Readout is accomplished by applying current to the reset line 180 (see FIG. 3) which drives the cryotrons 181 through 186 resistive and permits the establishment of current on the lines 31 and 32. Thereafter, current is applied to the terminals 21 through 23 and 41 through 43. Next the switches 51 through 53 are set on the readout contacts 81*a* and *b* through 83*a* and *b*, respectively. For column 1, the readout contacts 81*a* and 81*b* connect the current source 71 to the cryotrons 67*a* and *b* and 74*b* and 74*d* which are driven into the resistive condition. The cryotrons 67*a* disconnects the terminal 21 from the exit terminal 4. The cryotron 67*b* resets the current 174 to the line 31. The current at the input terminal 41 is directed to the alternate path 177 by the cryotron 74*b* being resistive. The resistive cryotron 74*d* prevents current from the terminal 21 flowing to the exit terminal 11 over the line 32. Accordingly, no current flows on the vertical line 32. Current does flow on the line 31, however, since the cryotron 74*a* is superconductive. Accordingly, the current supply terminal 21 is connected through cryotrons 198, 207, 220, and 74*a* to the reference point 11. For column 2, the switch 52 connects the current source 72 to the control conductors of the cryotrons 68*a* and *b* and 75*b* and *d* which are driven resistive. Accordingly, current flows from the terminal 22 through the vertical line 33 by way of the cryotron 199, 208, 221 and 75*a* to the reference point 12 for reasons similar to those indicated for the current flow in column 1. Similarly, the switch 53 connects the source 73 to the cryotrons 69*a* and *b* and 76*b* and *d* which are driven resistive and current flow from the terminal 23 through the vertical line 35 by way of the cryotrons 200, 209, 22, 76*a* to the reference point 13.

Simultaneously, current is supplied to the terminals 91 through 93 of the sense circuit and to the read line of the register from which information is desired, the register 1 being arbitrarily selected to facilitate explanation of the invention. Current on the read line 154 is prevented from flowing to the control unit by suitable means not shown. Current on the line 154 drives the cryotrons 198, 199 and 200 resistive which diverts the current at the points 121*a*, 122*a* and 123*a*, respectively, through the sense loops 121, 122 and 123, respectively which include the inline cryotrons 191, 192 and 193, respectively. In column 1 it will be recalled that a counter-clockwise current indicative of a binary "0" is stored in the loop 125. The storage loop current is in the opposite direction as the current passing through the inline cryotron 191 which remains superconductive for reasons previously explained. As a consequence, current flows on the line 31 to the reference point 11. The current on the line 31 drives resistive the cryotron 111*a* in the column sense circuit. With the cryotron 111*a* resistive, current applied to the terminal 91 flows to the output terminal 101 to indicate a binary "0" stored in the column. In column 2 the clockwise current indicative of a "1" stored in the loop 126 is in the same direction to the current through the storage loop 122. As a consequence, the inline cryotron 192 is driven resistive and current on the vertical line 33 terminates. Accordingly, the cryotron 112*a* in the column sense circuit goes superconductive and current applied to the terminal 92 flows through the cryotron 112*a* to the terminal 104 to indicate a binary "1" stored in the column. In column 3 an output occurs at the terminal 105 to indicate a binary "0" in the column, the explanation of the output being similar to that described for column 1.

Thus, it can be seen that readout of the memory device is accomplished by setting the switches of the input register on the read contacts and applying the current to the read line of the selected register. The output signals from the register will appear at the terminals 101 through 106, these signals corresponding to the information stored at the crosspoints of the selected register.

Storing information or reading information out of the memory in accordance with the information content of one or more bits of a word will next be described, this operation being previously defined as associative operation. For purposes of the present description, it will be assumed that the words 010, 000 and 100 are stored in the registers 1, 2 and 3, respectively and that it is desired to find those registers having the binary values 01 in the first and second storage positions of the registers. It will be apparent from the previous assumptions that only register 1 has the desired information therein, the other registers having combinations of binary bits different than 01. The switch 66 of the control circuit is set on the interrogate contact 107 to begin the associative operation. Next, the binary digits 0 and 1 are set on the switches 51 and 52 of the input register. The switch 53 of the register is set on the contacts 176*a* and *b* for the mask position. In column 1, current flows on the vertical line from the terminal 41 through the cryotrons 74*b*, 223, 217, 210, 204, 188, 195 and 67*a* to the terminal 4. In column 2 current flows on the vertical line 34 from the terminal 22 through cryotrons 196, 189, 205, 211, 218, 224, 75*c* and 75*d* to the terminal 12. In column 3, the switch 53 connects the source 73 to the cryotrons 76*f* and 70 which diverts the current from the line 31 and 32 to the alternate paths 176 and 179 which results in no current flowing on the lines 31 and 32. Thereafter, the compare equal lines 161 through 163 are energized. The compare currents normally flow to the control unit shown in FIG. 4 over the compare equal lines 161 through 163 unless terminated by a resistive cryotron thereon. Current is diverted along the compare not equal lines 171 to the control unit when a resistive cryotron appears in the lines 161 through 163. With currents on the vertical lines 32 and 34 only, and the compare lines 161 through 163, a comparison is performed between the information stored in column 1 and 2 and that in the input register. The information in column 3 is excluded from the comparison by the absence of current on the vertical line 36. The comparison provides the control circuit with signals indicating those registers having the binary values 01 therein which corresponding to that appearing in the input register and those registers having a binary value therein which do not correspond to those appearing in the input register.

In the comparison operation performed at register 1, the currents on the vertical lines 32 and 34 and the persistent currents in the storage loops 125 and 126 are in the opposite direction so the cryotrons 188 and 189 remain superconductive, as previously explained. The cryotron 190 is also superconductive since no current flows on the line 36. Accordingly, current flows on the compare equal line 161 to the control unit. In the other registers, however, the binary values stored therein do not correspond to those appearing in the input register. Accordingly, as will be pointed out hereinafter, currents on vertical lines to those registers will be in the same direction as the currents in the *d* storage section which results in the compare cryotrons of those registers being resistive. A resistive cryotron in the compare lines 162 and 163 will divert current to the control unit over the compare not equal lines 172 and 173 respectively for the registers 2 and 3, respectively.

Turning now to the control unit shown in FIG. 4, it will be recalled that the switch 66 has been set on the contact 107. Accordingly, the source 64 supplies current over the vertical line 44 to the cryotrons 41*a*, *b* and *c* and 42*a*, *b* and *c* of the control unit. The current on the line 161 from the matrix flows to the cryotrons 37*a* since the cryotron 41*a* is resistive by the current on the vertical line 44. Thereafter, current on the line 161 flows to the control conductor of the cryotron 29*a* and thence to the sink 50*a*. The gate conductor of the cryotron 29*a* is in the vertical line 28*a* which energized from the source 26*a*. The current on the line 161 drives the cryotron 29*a* resistive which results in current flowing from the source 26*a* through the line 27*a* to the current sink 25*a*. As will be seen hereinafter, current in the line 27*a* indicates a correspondence between the information in the register and that in the input register, whereas a current in the line 28*a* indicates a mismatch between the information in the register and that in the input register, Returning now to the registers 2 and 3 where it is assumed that the binary word 000 and 100, respectively have been stored therein, the cryotron 210 of register 2 would remain superconductive since the negative current on the vertical line 32 and the counter-clockwise current for the binary "0" in the storage loop 125 would be opposite directions. Current on the line 162 would then flow to the cryotron 211 in column 2 where the counter-clockwise current for the binary "0" in the loop 136 and the positive current on the vertical line 34 would be in the same direction which would drive the cryotron 211 resistive. As previously explained, current on the line 162 would be redirected to the compare not equal line 172 and flow to the control circuit. In the control circuit, the current on the line 172 would not flow to the cryotron 42*b* since it would have been driven resistive by the current on the vertical line 44. The current on the line 172 would then flow to the cryotrons 38*b* and 30*b* and the latter, which is included in the line 27*b* connected to the source 26*b*, would be driven resistive. Accordingly, current would flow from the source 26*b* to the current sink 25*b* by way of the vertical line 28*b*. The current in the line 28*b* would be indicative of a mismatch between the information in register 2 and that in the input register.

For the word 100 in the register 3, the cryotron 223 would be driven resistive due to the mismatch between the register information and that in the input register. Accordingly, current would flow on the line 173 since the cryotron 42*c* would be resistive by the current on the line 44. Current on the line 173 would flow through the cryotron 38*c* and drive the cryotron 30*c* resistive. Current would then flow on the line 28*c* to indicate the mismatch between the register information and the input information.

Thus, the memory has been fully interrogated for those registers which have binary values therein corresponding to the binary values appearing in the input register. In the event that all of the words were the same as the input register, the control circuits would operate in the manner similar to that described for register 1, and current would flow in the lines 27*a*, *b* and *c* to indicate the correspondence between the matrix and the input register information. Also, it is believed evident that the memory could be operated to select a single binary value in each register that corresponds to a single binary value in the input register or to select those registers having three binary values that correspond to three binary values in the register.

After interrogation of the memory, the switching circuit 10 is operated to readout of or write into those registers previously selected as having information therein corresponding to that in the input register. For a write operation, the information desired to be placed into the selected register can be set up in the input register. Thereafter the switches 65 and 66 are set to the write terminal 118 and the read or write terminals 108 respectively, the switches applying current to the vertical lines 49 and 39 respectively. Current on the line 49 is supplied to the cryotrons 46*a*, *b* and *c*. Current on the line 39 is supplied to the cryotrons 37*a*, *b* and *c* and 38*a*, *b* and *c*. Current on the lines 161, 172 and 173 does not flow through the cryotrons 37*a* and 38*b* and *c* since these cryotrons are resistive by the current on the vertical line 39. Accordingly, current on the lines 161, 172 and 173 is redirected to the nodes 24*a*, *b* and c respectively. Thereafter, current flows to the cryotrons 43a, b and c or 47a, b and c, depending upon the current flowing in the lines 27a, b and c and 28a, b and c, respectively. Since the cryotron 43a is resistive due to the current on the line 27a, the current at the node 24a flows to the cryotron 47a, and thence to the write line 151, the cryotron 46a being resistive due to the current on the vertical line 49. The current on the line 151 enables the information in the input register to be written into register 1 in the manner previously described.

Turning now to register 2, the control circuit operates to prevent a write current from appearing on the line 152. For register 2, it will be recalled that current is flowing on the lines 172 and 28b. The current on the line 172 is redirected to the node 24b when the interrogate switch 66 is switched to the read or write contact 108 since the cryotron 38b is driven resistive by the current on the vertical line 39. With current flowing on the line 38b, current at the node 24b can not flow to the write line 154 since the cryotron 47b will be resistive. Accordingly, currrent flows from the node 24b to the current sink 50b by way of the crytron 43b which remain superconductive due to the absence of a current on the vertical line 27b. Hence, the information appearing in the input register can not be stored in register 2 due to the absence of a current on the write line 152. Similarly, a write current is absent to register 3 and the information appearing in the input register can not be stored in the register 3.

It can be seen therefore, that the information appearing in the input register can only be placed into the register or registers which was or were selected on the interrogating operation as having binary values corresponding to one or more bits of a particular word.

Before readout of the memory of words stored therein which have binary values corresponding to one or more bits of a word appearing in the input register, the matrix and the control unit are reset by applying current to the reset lines associated therewith. It will be noted that the reset line for the control unit is not shown. It should also be noted that when the circuit of FIG. 11 is employed as the storage element of the matrix, a reset circuit is not necessary for the control unit.

The interrogating operation, previously described for the write operation is re-executed after reset. Accordingly, currents will appear on the compare lines 161, 172 and 173 of the matrix and on the vertical lines 27a, 28b and 28c of the control unit. Thereafter the switches of the input register are reset from the binary values "01" and the mask or *m* positions to contacts 81a and b through 83a and b or the read positions of the switches. Also, the switches 65 and 66 of the switching circuit 10 are repositioned to the read contact 117 and the read or write contact 108 respectively. With the switches 51 through 53 of the input register in the read position, current is terminated on the lines 32, 34 and 36 and appears on the lines 31, 33 and 35 of the matrix. Positioning the switches 65 and 66 in the manner previously described results in current flowing on the vertical lines 48 and 39 of the control unit respectively. The current on the vertical line 39 drives the cryotrons 37a, 38b and 38c resistive which redirects the current on the lines 161, 172 and 173 respectively to the nodes 24a, b and c respectively.

For register 1, current flows through the cryotron 47a to the read line 154 since the cryotron 45a is resistive, the cryotron being in the vertical line 48. Current on the line 154 drives resistive the cryotrons 198, 199 and 200 of the matrix. As a consequence, currents on the lines 31, 33 and 35 are diverted into the sense loops 121, 122 and 123 respectively. The inline cryotrons 191, 192 and 193 in the sense loops 121, 122 and 123 respectively remain superconductive or are driven resistive in accordance with the direction of the current stored in the loops. Thus, the cryotrons 191 and 193 are superconductive since the sense current and the stored current in the loops 125 and 127 are in opposite directions. The cryotron 192, however, is resistive since the sense current and the stored current in the loop 126 are in the same direction. The column sense circuit responds to the condition of the cryotrons 191 through 193 to provide an output at the terminals 101 through 106. For columns 1 and 3, a current appears at the terminals 101 and 105 respectively since the cryotrons 111a and 113a are resistive, and for column 2 a current appears at the terminal 104 since the cryotron 112b is superconductive. It will be seen that the currents at the previously indicated terminals correspond to the binary word appearing in the matrix which was selected during the previous interrogating operation.

For registers 2 and 3, current does not flow to the read lines 155 and 157, respectively since the cryotrons 47b and c are resistive due to the currents flowing in the vertical lines 28b and c respectively. Instead, the currents at the nodes 24b and c flow to the current sinks 50b and c respectively by way of the cryotrons 43b and c, respectively which are superconductive due to the absence of a current on the lines 27b and c, respectively.

Thus it can be seen that the present invention permits a word to be readout of a single register where one or more bits of the word correspond to a desired word. In computer systems employing multiple address instruction, however, the memory of the present invention may be modified to provide multiple output circuits for each register so that in the event that more than one register was selected during the interrogating operation, an output could be obtained from each. As stated before, a single output circuit was selected for the present embodiment to facilitate the description of the invention.

It is believed apparent from the previous description that a memory device has been disclosed which employs relatively few cryogenic devices for performing reading and writing operations as well as storing and retrieving information in/from a matrix in accordance with the information content of a word. Moreover, any bit of a word can be masked out during a storage or retrieving operation by removing the external signal to the bit. The relatively few cryogenic devices reduce the size of the power supply required for the invention and makes possible a memory of relatively low initial cost and operating expense.

While the invention has been particularly shown and described with reference to preferred embodiments thereof, it will be understood by those skilled in the art that the foregoing and other changes in form and details may be made therein without departing from the spirit and scope of this invention.

What is claimed is:

1. A memory system comprising a plurality of registers for storing information therein, each register having a plurality of persistent current storage loop elements, an input register adapted to record binary values and transmit to the storage elements signals representative of the binary values recorded therein, means for writing into the persistent current storage loop elements signals representative of the binary values transmitted from the input register, means for reading out of the storage element the binary values stored therein, means within each register for comparing the binary values stored in all or a portion of the persistent current storage elements of all registers with the binary values recorded in the input register, and means for writing into or reading out of all registers where the binary values of the stored signals and the recorded signals correspond.

2. A memory system comprising a plurality of registers for storing information, each register having a plurality of persistent current storage loop elements therein, circuit means for transferring information into or out of the registers, entry registers for controlling the information to be transferred into the registers, means for interrogating the registers to select those registers having information therein which corresponds to the information appearing in the entry registers, masking means for disconnecting selected storage elements from said entry register thereby excluding said selected storage elements while operation of the interrogating means occurs and means for providing output signals from those registers having information therein corresponding to the information appearing in the entry register.

3. A memory system comprising a plurality of registers for storing information therein, each register having a plurality of persistent current storage loop elements, an input register for supplying external signals to said register analagous to binary values, means for storing in the storage elements signals of binary values corresponding to the external signals, means within each register for comparing the external signals with the signals stored in the storage elements to indicate equality or inequality therebetween, masking means for disconnecting a storage element from the external signals to exclude the storage element from a comparison with the external signals and means indicating those registers which have stored signals that correspond to the external signals of the input register and for providing output signals of the binary values stored in the storage elements.

4. A memory system comprising a plurality of registers for storing information therein, each register having a plurality of persistent current storage loop elements, an input register adapted to connect to the storage elements of said registers external signal sources representative of binary values, means for storing in the persistent current storage loop elements signals of binary values corresponding to the external signal supplied to the storage element, means for reading out signals stored in the storage elements, comparison circuit means within each register controlled by means responsive to the external signal sources and the signals stored in the persistent current storage elements, said comparison circuit adapted to indicate whether or not the stored signals match the external signal sources, means for màsking a storage element during a comparison, interrogating means responsive to the comparison circuit to record whether or not the signals stored in the persistent current storage elements match the external signals supplied thereto, and means for operating said interrogating means to write into or read out of those registers where the signals stored in the storage elements thereof match the external signals supplied thereto.

5. A memory system comprising a plurality of registers for storing information therein, each register having a plurality of persistent current storage loop elements therein, said storage element comprising a first superconductive path adapted to receive signals from an external source, a second superconductive path adapted to receive external signals representative of either binary value, means for diverting current on the second superconductive path through a second superconductive loop to establish a persistent current therein representative of a binary value according to the external signal on the second superconductive path, means for diverting current on the first superconductive path through a first superconductive loop to sense the binary value stored therein, means responsive to the persistent current and the external signal on the second superconductive path to compare and indicate whether or not the binary values thereof correspond, means for suppressing the external signal to a storage element to mask said element from a comparison and means for reading out of or writing into those registers where the binary values of the external signals on the second superconductive paths and the second superconductive loops correspond.

6. A memory system comprising a plurality of registers for storing information therein, each register having a plurality of persistent current storage loop elements, means for storing in the persistent current storage elements signals representative of binary values, means including sense loops for reading out the binary values stored in the persistent current storage loops, means within each register for comparing external signals representative of a binary value with the binary values stored in the persistent current storage elements, means for masking out selected persistent current storage elements during a comparison of the binary values of the external signal sources and the binary values stored in the persistent current storage elements, interrogating means adapted to record whether or not the binary values stored in the storage elements of a register correspond to the binary values of the external signals, and means for operating said interrogating means to write into or read out of those registers where the signals stored in the register correspond to the external signal.

7. The memory system as previously defined in claim 6 wherein the interrogating means comprises flip flop circuits associated with each register for recording signals indicative of the comparison between the binary signals stored in the persistent current storage elements thereof and the external signals and means responsive to the operating means for providing output signals from those registers wherein the binary values stored in the storage elements of the register correspond to the external signals.

8. A circuit for storing a binary value and indicating whether or not the value of a binary input applied thereto compared with the binary value stored therein comprising a first superconductive path adapted to receive currents of either polarity, each polarized current being representative of a different binary value, a second superconductive path adapted to receive an external signal, means for diverting current on the first superconductive path through a first superconductive loop to establish a persistent current therein representative of a binary value according to the binary value of the current on the second superconductive path, means for diverting current on the second superconductive path through a second superconductive loop, means responsive to the persistent current and the current on the second superconductive path to provide an output signal indicative of the binary value stored in the first loop, and means responsive to the persistent current and the current of the first superconductive path to provide an indication of equality between the binary value stored in the first loop and the binary value represented by the current on the first superconductive path.

9. A circuit for storing a binary value and indicating whether or not a value of a binary input applied thereto compares with the binary value stored therein comprising a first superconductive path adapted to receive currents of either polarity, each polarized current being representative of a different binary value, a second superconductive path adapted to receive an external signal, means for diverting current on the first superconductive path through a first superconductive loop to establish a persistent current therein representative of a binary value acording to the binary value of the current on the first superconductive path, means for diverting current on the second superconductive path through a second superconductive loop, means responsive to the external signal and the current in the first superconductive loops to control circuit means in providing an output signal indicative of the binary value stored in the first superconductive loop, a compare circuit, when energized, adapted to indicate whether or not the binary value of a current on the first superconductive path corresponds to the binary value stored in the first superconductive loop and means to mask the binary value stored in the first superconductive loop when the compare circuit is energized.

10. A circuit for storing a binary value and indicating whether or not a value of a binary input applied thereto compares with the binary value stored therein comprising a first superconductive path adapted to receive currents of either polarity, each polarized current being representative of a different binary value, a second superconductive path adapted to receive an external signal, means for diverting current on the first superconductive path through a first superconductive loop to establish a persistent current therein representative of a binary value, means for diverting current on the second superconductive path through a second superconductive loop, means responsive to the external signal current to second superconductive loops and the persistent current stored in the first superconductive loop to provide a signal indicative of the binary value stored in the first superconductive loop, and means responsive to the persistent current stored in the first superconductive loop and the current on the first superconductive path to control the flow of current in a compare equal or not equal circuit.

11. A circuit for storing a binary value and indicating whether or not a value of a binary input applied thereto compares with the binary value stored therein comprising a first superconductive path adapted to receive currents of either polarity, each polarized current being representative of a different binary value, a second superconductive path to receive an external signal means for diverting current on the first superconductive path through a first superconductive loop, means for diverting current on the second superconductive path through a second superconductive loop to establish a persistent current therein representative of a binary value identical to the binary value of the current on the first superconductive path, means responsive to the currents in the first and second superconductive loops to control the flow of current on the second superconductive path, means for diverting the current on the second superconductive path to an alternate path to indicate one binary value stored in the loop when current flow thereon is terminated by the means responsive to the currents in the first and second loops, the flow of current on the second superconductive path indicating the other binary value stored in the loop, and a controlled current cryogenic device disposed in the first superconductive path and loop to control a comparison circuit including a normal and alternate superconductive path, whereby the controlled cryogenic device is resistive when the binary value stored in the first superconductive loop and the binary value represented by the current on the first superconductive path are unlike and the controlled current cryogenic device is superconductive when the binary value stored in the first superconductive loop and the binary value represented by the current on the first superconductive path are alike.

12. The circuit described in claim 11 including means for preventing a comparison between the binary value represented by the current on the first superconductive path and the binary value stored in the first superconductive loop.

13. A circuit for storing a binary value and indicating whether or not a value of a binary input applied thereto compares with the binary value stored therein comprising a first superconductive path adapted to receive currents of either polarity, each polarized current representative of a different binary value, a second superconductive path adapted to receive an external signal, means for diverting current on the first superconductive path through a storage loop to establish a persistent current therein representative of a binary value, a source of read signals, means responsive to the persistent current stored in the loop to indicate the binary value of the persistent current stored in the storage loop, a comparison circuit for indicating whether or not the binary value of the persistent current stored in the storage loop and the binary value of the current on the first superconductive path correspond, and means for suppressing the current on the first superconductive path to prevent a comparison between the binary value of the current for the first superconductive path and the binary value of the persistent current stored in the storage loop.

14. The circuit as described in claim 13 including a first cryotron in the comparison circuit which is normally superconductive until the presistent current in the storage loop and current on the first superconductive path additively combine whereupon the first cryotron is driven resistive and a second cryotron in the comparison circuit which is resistive when the first cryotron is superconductive and superconductive when the first cryotron is resistive.

15. A memory system comprising a plurality of registers for storing information therein, an entry register adapted to record binary values and transmit signal currents representative of the binary values recorded therein, each storage register having a plurality of storage circuits, each storage circuit comprising a first superconductive path adapted to receive currents of either polarity from said entry register, means for supplying an external signal current indicative of a binary value, a second superconductive path adapted to receive the external signal current, means for diverting current on the first superconductive path through a first superconductive loop to establish a persistent current therein representative of a binary value according to the binary value of the current on the second superconductive path, means for diverting current on the second superconductive loop, means responsive to the persistent current and the current on the second superconductive path to provide an output signal indicative of the binary value stored in the first loop, and means responsive to the persistent current and the current of the first superconductive path to provide an indication of equality between the binary value stored in the loop and the binary value represented by the current on the first superconductive path, and means for writing into or reading out of all registers where the binary values of the persistent current and the recorded signals in the entry register correspond.

16. A memory module comprising:

a plurality of interconnected bit handling segments, each of said segments having writing, storing, reading and comparing means;

a single input line in each bit handling segments for handling storage input information and comparing input information; and means for reading stored information from each of said bit handling segments along a single output line.

17. A memory module comprising:

a plurality of interconnected bit handling segments, each of said segments having means for writing, storing, reading and comparing information;

a single input line in each bit handling segment for handling storage input information and comparing input information; and means for reading stored information from each of said bit handling segment along a single output line.

18. A memory module comprising:

a plurality of interconnected superconductive bit handling segments;

a single input line connecting each bit handling segment for handling storage input information and comparing input information, each of said segments comprising a persistor circuit for storing information in the form of a circulating current;

means in said persistor circuit responsive to a transmitted key signal for identifying said stored information with said transmitted key information by sensing the direction of said circulating current in part of said persistor circuit; and means for reading out said stored information from all segments.

19. A memory module comprising:

a plurality of interconnected superconductive bit handling segments;

a single input line connecting each bit handling segment for handling storage input information and comparing input information, each of said segments comprising a persistor circuit for storing information in the form of a circulating current;

comparing means comprising a superconductive device in said persistor circuit responsive to a transmitted key signal for comparing said stored information with said transmitted key information by sensing the direction of said circulating current in part of said persistor circuit; and means for reading out said stored information from all segments.

20. A memory module comprising:

a plurality of interconnected superconductive bit handling segments;

a single input line connecting each bit handling segment for handling storage input information and comparing input information, each of said segments comprising a persistor circuit for storing information in the form of a circulating current;

read out means comprising a dual control superconductive device in said persistor circuit responsive to current in said comparing means and said circulating current for identifying said stored information; and means for reading out said stored information from all segments.

21. A memory cell comprising:

a control module and memory module, said control module comprising a plurality of bit handling segments for writing, storing, reading and comparing information, comparing means in each of said bit handling segments for indicating a true comparison between stored information and new information;

reading means in each of said bit handling segments for reading out stored information;

writing means in each of said bit handling segments for writing in new information;

storing means in each of said bit handling segments for storing new information;

each of said bit handling segments having a single input line for receiving said writing, storing, reading and comparing information;

said control module comprising means for operationally controlling said comparing means, said reading means, said writing means and said storing means in said memory module; and means for reading information from each segment.

References Cited

UNITED STATES PATENTS

| | | | |
|---|---|---|---|
| 2,900,620 | 8/1959 | Johnson | 340—149 |
| 2,959,768 | 11/1960 | White | 340—149 |
| 2,832,897 | 4/1958 | Buck | 340—173.1 |
| 2,877,448 | 3/1959 | Nyberg | 340—173.1 |
| 2,969,469 | 1/1961 | Richards | 340—173.1 |
| 3,001,178 | 9/1961 | Buck | 340—173.1 |

OTHER REFERENCES

IBM Technical Disclosure, Buck, vol. 2, No. 4, December 1959, pp. 123–124.

TERRELL W. FEARS, *Primary Examiner.*